United States Patent
Maruyama et al.

(10) Patent No.: US 7,234,871 B2
(45) Date of Patent: Jun. 26, 2007

(54) SLIDING BEARING FOR USE UNDER HIGH LOAD

(75) Inventors: Kazuo Maruyama, Matsudo (JP); Motohiro Miyasaka, Matsudo (JP); Osamu Mawatari, Matsudo (JP)

(73) Assignee: Hitachi Powdered Metals Co., Ltd., Chiba (JP)

( * ) Notice: Subject to any disclaimer, the term of this patent is extended or adjusted under 35 U.S.C. 154(b) by 91 days.

(21) Appl. No.: 11/158,083

(22) Filed: Jun. 22, 2005

(65) Prior Publication Data

US 2005/0286822 A1    Dec. 29, 2005

(30) Foreign Application Priority Data

Jun. 23, 2004    (JP) .............................. 2004-184534

(51) Int. Cl.
*F16C 33/12*    (2006.01)
(52) U.S. Cl. ..................................... 384/292
(58) Field of Classification Search ................ 384/292, 384/902, 279, 276, 912
See application file for complete search history.

(56) References Cited

FOREIGN PATENT DOCUMENTS

| JP | 8-2494 Y2 | 1/1996 |
|---|---|---|
| JP | 10-246230 | 9/1998 |
| JP | 2003-222133 | 8/2003 |

*Primary Examiner*—Lenard A. Footland
(74) *Attorney, Agent, or Firm*—Birch, Stewart, Kolasch & Birch, LLP

(57) ABSTRACT

A sliding bearing which is suitable for and durable in the use under high load of sliding in rocking motion, and the structure of bearing is not complicated so as to facilitate the manufacturing. The alloy used for making the bearing is composed of iron-based sintered alloy having quenched structure, and the bearing surface is provided with inclined grooves of an inclination angle of 10 to 40° relative to the direction perpendicular to the sliding direction and a width of 2 to 8 mm and the area of inclined grooves is 50% or less of the total inner bearing surface and an imaginary line perpendicular to the sliding direction crosses both the inclined groove and the bearing surface at any position of the inner surface of bearing. When the bearing is used, at least the inclined grooves are impregnated with a lubricant.

5 Claims, 1 Drawing Sheet

SLIDING BEARING FOR USE UNDER HIGH LOAD

BACKGROUND OF THE INVENTION

1. Field of the Invention

This invention relates to sliding bearings that are used for large-sized apparatus such as construction machinery, in which shafts and bearing members are applied with large force of sliding of rocking motion under high surface pressure.

2. Prior Art

The conventional sliding bearing in a relatively large-sized cylindrical shape has been manufactured through powder metallurgy owing to its advantages in production cost and yield. The relatively large-sized sliding bearings used for construction machinery are composed of porous iron sintered alloy of quenched structure containing dispersion of soft copper particles and they are subjected to high surface-pressure with receiving rocking motion at a low speed. (Japanese Laid-Open Patent Publication No. H10-246230). The fine pores of sintered alloy are impregnated with high viscosity lubricating oil, grease or wax or their mixture suitable for the applied surface pressure, or the lubricant is further mixed with a solid lubricant and/or an extreme pressure additive.

As a measure to improve the durability of sliding bearing for construction machinery, it has been proposed that a plurality of parallel rows of ridges of 2 to 12.5 μm in height are formed in the inner circumferential surface along the direction of axis and the area of fine pore openings in the inner surface is reduced by compacting the inner surface portion, thereby improving the durability by supplying sliding portion with lubricant oil with retaining it within the rows of ridges. (Japanese Laid-Open Patent Publication No. 2003-222133). Furthermore, it is proposed that X-shaped oil grooves are formed in the inner surface in order to prevent the bearing surface from abnormal abrasion by facilitating the supply of lubricant to the sliding surface. (Japanese Utility Model Publication No. H8-2494).

The bearing which is composed of a porous iron sintered alloy of quenched structure containing dispersion of soft copper particles and is impregnated with lubricant such as wax, surpasses in wear resistance to a certain extent. However, bearings having more excellent wear resistance are demanded in the field of relevant industry. If oil grooves are formed in inner surface, lubricant oil can be supplied easily to sliding surface to improve the wear resistance, however, when the depth of grooves (height of ridges) is only several micrometers, the rows of ridges are liable to be worn off and the supply of lubricant becomes worse. In the case of the formation of X-shaped grooves, the manufacturing of bearings is somewhat difficult because the grooves must be formed through cutting process.

BRIEF SUMMARY OF THE INVENTION

The sliding bearing for use under a high load (heavy load) according to the present invention is composed of sintered iron alloy of quenched structure. In the inner surface of the bearing is provided with a plurality of inclined grooves at an inclination angle in the range of 10 to 40° relative to the direction perpendicular to the sliding direction. The width of the inclined grooves is in the range of 2 to 8 mm and the area ratio of the inclined grooves is 50% or less of the total area of the inner surface of bearing. In addition, an imaginary line perpendicular to the sliding direction crosses both the bearing surface and inclined grooves at any position of the inner surface of bearing. When the bearing is used, at least the foregoing inclined grooves are impregnated with a lubricant.

The maximum depth of each inclined groove is preferably in the range of 0.5 to 3 mm from the cylindrical inner surface of the bearing.

In addition to the provision of the above inclined grooves, a plurality of helical or circular rows of ridges of 2 to 20 μm in height and extending in the circumferential direction, are formed in the bearing surface by means of cutting process.

The material of sliding bearing having the inclined grooves or both inclined grooves and rows of ridges, is any one of (A) a sintered alloy containing 7 to 30% by mass of copper, in which copper particles and/or copper alloy particles are dispersed in the iron-based alloy containing metal structure of martensite;

(B) a sintered alloy of the metal structure, in which 5 to 30% by mass of iron-based alloy particles or cobalt-based alloy particles that are harder than the above iron-based alloy (A), is dispersed in the above iron-based alloy (A); and (C) a sintered alloy, in which 3% by mass or less of graphite and/or molybdenum disulfide is contained in the above sintered alloy (A) or in the above sintered alloy (B).

The sliding bearing of this kind for high load is characterized in that it is used under the sliding of rocking motion of a shaft and the bearing member and the surface pressure exerted to the shaft surface and the sliding surface is 20 MPa or more.

BRIEF DESCRIPTION OF THE DRAWINGS

These and other objects and features of the invention will become more apparent from the following description taken in connection with the accompanying drawings.

DETAILED DESCRIPTION OF THE INVENTION

Figure 1:
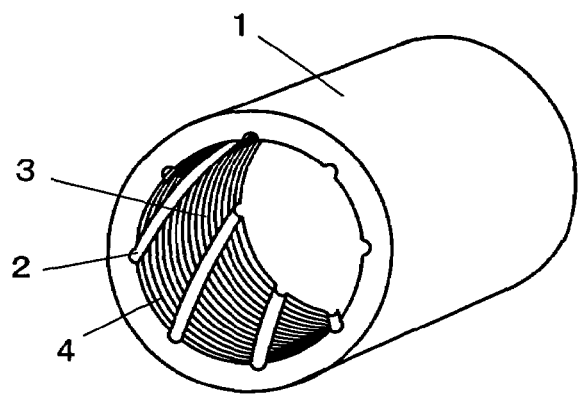
FIG. 1 is a perspective view of an embodiment of a sliding bearing of the present invention.

The sliding bearing for use under high load according to the present invention contains the dispersion of soft phase of copper or copper alloy in the iron-based alloy containing martensitic structure. So that, it has the strength to resist high surface pressure as well as the conformability to the surface of mating member (the member to be brought into contact with the bearing). Furthermore, the quantity of leakage of lubricant is small, so that quite good wear resistance can be expected with the use of the lubricant having a viscosity suitable for the high surface pressure. Still further, the inner surface of the bearing is provided with a plurality of inclined grooves at an inclination angle of 10 to 40° relative to the direction perpendicular to the sliding direction, so that the lubricant held in the grooves is supplied to the sliding surface and, as a result, excellent durability can be attained even when the bearing is used under high pressure of sliding in rocking motion.

The width, inclination angle and number of inclined grooves are determined in such a manner that, at any position of an imaginary line that is perpendicular to the sliding direction on the inner surface of bearing, the imaginary line may cross both the bearing surface and the inclined groove. So that, the surface of mating shaft is always brought into contact with both the bearing surface and the inclined oil groove to produce preferable lubricating effect when a load of shaft is exerted at any position of the inner surface of the bearing.

The depth of each inclined groove is in the range of 0.5 to 3 mm, so that the volume of each groove is relatively large and much lubricant can be held within the groove. Furthermore, even when a foreign substance comes into the bearing, the foreign substance can be captured in that groove, which can delay the occurrence of wearing. In addition, there is no need to consider the direction of bearing when the bearing is mounted on an apparatus. The inclined grooves can be formed by using a die during the compacting operation of powder material, so that the production can be carried out effectually.

In addition to the above inclined grooves, a plurality of helical or circular rows of ridges of 2 to 20 μm in height are formed in the bearing surface in circumferential direction by means of a cutting tool. Thus, the ability to maintain and to supply lubricant to the sliding surface can be increased and the durability is improved. When both the inclined grooves and the rows of ridges are formed, even when the rows of ridges are partially worn off and the supply of lubricant from the rows of ridges is reluctantly reduced, that portion can be supplied with the lubricant from the inclined grooves. Accordingly, it is advantageous in that the serviceable life of bearing can be prolonged and the frequency of maintenance operation can be reduced.

In order that those skilled in the art may better understand the present invention and manner in which it may be practiced, the following specific examples are given.

1. Sintered Alloy

As the sintered alloy for the sliding bearing, the following 6 kinds of alloys are suitable.

(1) Sintered Alloy 1

The sintered alloy 1 is prepared by mixing iron powder, copper powder and graphite powder to form a composition, by mass, of C: 0.3 to 1.5%; Cu: 7 to 30%; and the balance of substantially Fe. The powder mixture is then subjected to compacting and to sintering. The matrix is iron-carbon-based alloy mainly composed of martensitic structure and the particles of copper and/or copper alloy containing iron are dispersed therein. As unavoidable impurities, manganese (Mn) and silicon (Si) are contained which exist commonly in iron powder.

The structure of matrix may be martensite, or otherwise troostite or bainite can be contained partially to give similar properties. Furthermore, sorbite can be contained partially. The hardness of the matrix is preferably about 450 to 750 in Vickers hardness. The ingredient of carbon (C) is added in the form of graphite and the graphite content is diffused into the matrix of iron (Fe) during the sintering. The sintering is done under the conditions of temperatures and time-length that the added copper powder is not completely subjected to alloying with Fe component. After the sintering, the sintered material is treated by hardening and tempering. The hardening can be done during the cooling process in sintering.

If the content of C is less than 0.3% by mass, the strength is not sufficient, so that wearing is liable to occur. On the other hand, if the content of C is more than 1.5% by mass, the bearing material becomes too hard and the wearing of a mating shaft is accelerated. Accordingly, the content of C in the sintered alloy is preferably in the range of 0.3 to 1.5% by mass. When the addition quantity of graphite powder is large, it exists sometimes in the form of free graphite in the matrix of sintered material, in which the free graphite can produce the effect as a solid lubricant.

A part of Cu content is diffused into Fe matrix during the sintering, while the other part of Cu content dissolves Fe to form a copper alloy. Therefore, when the sintered alloy is cooled, a structure of iron-carbon alloy matrix containing the dispersion of copper or copper alloy phase is obtained. The copper phases and copper alloy phases are comparatively soft, so that these components can suppresses the mechanical attack against a shaft of mating member by being deformed appropriately so as to improve the conformability.

If the content of Cu is less than 7% by mass, its effect is insufficient. On the other hand, if the content of Cu is more than 30% by mass, the mechanical strength of material is impaired, so that the wearing is liable to occur under high surface pressure. Accordingly, the quantity of Cu is preferably in the range of 7 to 30% by mass. By the way, the most preferable content of Cu is about 15% by mass.

It is desirable that the pores of sintered alloy are impregnated with a lubricant as described in the following passage. The porosity of a sintered alloy is preferably in the range of about 15 to 20% in the like manner as those of conventional sintered oil-impregnated bearings. In the case that the surface pressure is especially high and higher strength and larger wear resistance are required, the density is increased in order to improve the durability. When the density of alloy is set low, apertures of pores in the inner surface are partially blocked-up by treating the inner surface with a grinding wheel or a cutting edge so as to give the surface property similar to the surface of a higher density alloy. If the porosity is larger than 25%, (the density is lower than about 5.8 $Mg/m^3$), it is necessary to pay attention to the lowering of wear resistance owing to the loss of mechanical strength.

Sintered Alloy 2

The sintered alloy 2 is prepared by dispersing 5 to 30%, by the total mass of the alloy 2 to be obtained, of a relatively hard iron-based alloy particles consisting, by mass, of C: 0.6 to 1.7%; Cr: 3 to 5%; W: 1 to 20%; and V: 0.5 to 6% into the balance of the foregoing sintered alloy 1. The particles of this iron-based alloy have the composition corresponding to a kind of high-speed tool steel and it is mixed in the form of alloy powder into the powder mixture. In this sintered alloy 2, the iron-carbon based matrix containing martensite is mixed with the dispersion of harder alloy particles, so that the deformation of base matrix can be reduced in the sliding contact with a shaft, thereby reducing the burden to the matrix. Accordingly, the bearing member that is suitable for use under high surface pressure, e.g., surface pressure of 80 MPa or more, can be produced.

If the content of iron-based alloy particles in the total mass of sintered alloy 2 is less than 5%, the above-described effect is insufficient. On the other hand, if the content of iron-based alloy is more than 30%, the obtained material accelerates the wearing of mating member, so that the performance as a bearing member is impaired. Accordingly, the preferable content of iron-based alloy particles is 5 to 30% by mass. When the iron-based alloy particles are harder than the iron-carbon matrix containing martensite, the composition can be determined optionally. However, in the case that a contained element such as carbon is diffused into the matrix and the hardness is made even, its effect is insufficient notwithstanding the production cost.

Furthermore, the use of Ni-based hard alloy is considered as the hard particles, however, in this case, Ni content in the Ni-based hard alloy diffuses into neighboring matrix to loss the hardness of the hard alloy. In addition, the adherence between the hard alloy and the matrix is not good. Therefore, it is necessary to select alloys as the iron-based alloy particles which are free from the above-described disadvantages. For instance, the following alloys are suitable.

(3) Sintered Alloy 3

The sintered alloy 3 is prepared by dispersing 5 to 30%, by the total mass of the alloy 3 to be obtained, of a relatively hard iron-based alloy particles consisting, by mass, of C: 0.6 to 1.7%; Cr: 3 to 5%; W: 1 to 20%; V: 0.5 to 6%; and 20% or less of Mo and/or Co into the balance of the foregoing sintered alloy 1. The material of this iron-based alloy particles is a kind of high-speed tool steel and it is added in the form of alloy powder into the powder mixture. The performance and effects of this sintered alloy 3 are similar to those of the foregoing alloy.

(4) Sintered Alloy 4

The sintered alloy 4 is prepared by dispersing 5 to 30%, by the total mass of the alloy 4 to be obtained, of relatively hard Mo—Fe alloy particles consisting, by mass, of Mo: 55 to 70 into the balance of the foregoing sintered alloy 1. The material of this Mo—Fe alloy particles is added into the powder mixture in the form of ferro-molybdenum alloy powder containing less quantity of carbon as defined in JIS (Japanese Industrial Standards). The performance and effects of this sintered alloy 4 are similar to those of the foregoing alloy.

(5) Sintered Alloy 5

The sintered alloy 5 is prepared by dispersing 5 to 30%, by the total mass of the alloy 5 to be obtained, of Co alloy particles containing, by mass, of Cr: 5 to 15%; Mo: 20 to 40%; and Si: 1 to 5% into the balance of the foregoing sintered alloy 1. This alloy powder is commercially available as a heat resistant/wear resistant alloy powder for use in overlay welding by thermal spraying (e.g., made by Cabot Corp.; trademark: Tribaloy). The performance and effects of this sintered alloy 5 are similar to those of the foregoing alloys.

(6) Sintered Alloy 6

The sintered alloy 6 is prepared by adding 3% by mass or less of at least one member selected from the group consisting of graphite, molybdenum disulfide, tungsten disulfide, boron nitride, silicon nitride, graphite fluoride and enstatite into the balance of one sintered alloy of the foregoing sintered alloys 1 to 5. These particulate materials having the function as solid lubricant can reduce the metal-to-metal contact in sliding motion to improve the wear resistance. Among them, the graphite and molybdenum disulfide are preferably used. The more these components are contained, the more effects are produced. However, if the content of these particulate materials exceeds 3%, the strength of alloy is sometimes lowered and the wearing is accelerated.

In the following, the configuration of the bearing having oil grooves according to the present invention is described with reference to the accompanying drawings.

FIG. 1 is a perspective view of an embodiment of a cylindrical bearing of the present invention. In the inner surface of a bearing 1 is provided with a plurality of inclined grooves 2. Each groove 2 is inclined relative to the direction perpendicular to the sliding direction. In the embodiment shown in FIG. 1, the number of grooves 2 is eight (8). The bearing surface 3 is provided with a large number of rows of ridges 4 extending in the circumferential direction. The height of each ridge 4 is in the range of 2 to 20 μm and the rows of ridges are formed by cutting operation.

2. Inclined Grooves

Figure 2:
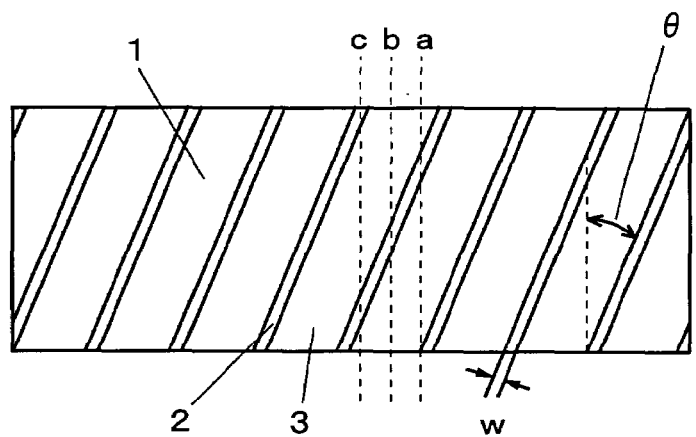
FIG. 2 is a development of the inner surface of the bearing to illustrate the inclined grooves and bearing surfaces.

FIG. 2 is a development of the bearing to illustrate the inner surface of the bearing 1. The length of bearing 1 corresponds to the vertical side of the developed rectangular configuration in FIG. 2 and the sliding direction is the lateral (horizontal) direction on the inner surface of the bearing 1. Inclined grooves 2 are formed in the inner surface at regular intervals. The space between adjacent grooves 2 is a respective bearing surface 3.

The angle of inclination θ of the groove 2 relative to the imaginary lines a, b, c is in the range of 10 to 40°, wherein the imaginary lines are indicated by dotted lines and are perpendicular to the sliding direction. The width w of each groove 2 is in the range of 2 to 8 mm. The total area of the surfaces of grooves does not exceed 50% of the inner surface of bearing 1. The inclined grooves 2 are disposed such that any imaginary line a, b, or c can cross both the bearing surface and the inclined groove at any position of the inner surface of the bearing 1.

The cross-sectional configuration of the inclined groove 2 is any one of arcuate, U-shaped, V-shaped, and rectangular forms. It is preferable that the marginal edge of the inclined groove 2 is chamfered so as to allow the passage of lubricant through the gap between shaft and bearing surface and the inclined grooves.

If the width w of inclined groove 2 is smaller than 2 mm, the lubricating effect is lowered because the lubricant is hardly supplied to the space between the bearing surface and the mating shaft surface, so that marked improvement in durability cannot be expected. Therefore, at least 2 mm of the width of inclined groove is required. If the width of the inclined groove 2 is large enough, the lubricant can be supplied into the gap between the bearing surface and the shaft surface to facilitate the lubrication of mating shaft. Meanwhile, if the width w of groove 2 is larger than 10 mm, the leakage of lubricant to the outside of bearing is liable to occur.

Furthermore, when the bearing is installed at a position at which the maximum load of a mating shaft is exerted to both marginal edges of the groove 2, the surface pressure received by the marginal edges becomes largest. As a result, the lubrication can be done effectively, however, the rate of wearing is increased. Accordingly, the width of groove 2 is desirably limited to about 8 mm at the maximum. Meanwhile, it is more preferable that the width w of inclined groove 2 is about 4 to 6 mm.

It is desirable that the depth from the inner cylindrical surface of bearing 1 to the bottom of the inclined groove 2 is within the range of 0.5 to 3 mm. When the depth of inclined groove 2 is smaller than 0.5 mm, the volume to store the lubricant is too small, so that the lubricating effect is not continued long enough. On the other hand, if the depth of the inclined groove 2 is larger than 3 mm, the thickness of bearing becomes insufficient, so that strength of bearing is insufficient, in addition, the leakage of lubricant is liable to occur. Therefore, the preferable depth of the inclined groove is about 1 to 2 mm.

The inclination angle θ of the inclined groove 2 is measured in view of the direction (a vertical line in FIG. 2) that is perpendicular to the sliding direction as described above, meanwhile the sliding direction is parallel to the horizontal side of the developed rectangular bearing 1 and imaginary lines a, b and c are represented with vertical dotted lines. When the inclination angle θ is about zero (0), the inclined groove 2 is perpendicular to the sliding direction. In such a case, even when the width of grooves and the number of grooves are determined appropriately, if the groove is positioned at the maximum load of the mating shaft, the large load is applied to both edges of the groove to cause the wearing of the bearing surface, and the positioning of bearing member is troublesome. Meanwhile, if the inclination angle θ is 90° (the same direction as the sliding direction), the lubricant is caused to move to and fro in the grooves and the lack of lubricant on the bearing surface is liable to occur when the lubricant is not supplemented continuously as in the bearing under static pressure.

When the groove 2 is inclined by the inclination angle θ, the above disadvantages can be eliminated. If the inclination angle θ is smaller than 10°, the foregoing imaginary lines that are perpendicular to the sliding direction, cannot cross both the bearing surface and the inclined groove at any position of the inner surface of the bearing, otherwise, the number of inclined grooves must be increased. If the number of inclined grooves is increased, the area of bearing surfaces 3 in the inner surface of bearing is decreased, which is not desirable because the surface pressure to the bearing surface is increased. If the inclination angle θ of inclined grooves 2 is more than 40°, the ejection of green compact from a compacting die becomes difficult when the cylindrical bearing body is formed with a die. The preferable value of the inclination angle θ is about 20°.

The number of inclined grooves 2 is determined such that the total surface area of inclined grooves 2 does not exceed 50% of the total inner surface of the bearing 1 and, at the same time, the imaginary lines that are perpendicular to the sliding direction, can cross both the bearing surface and the inclined groove at any position of the inner surface of the bearing. In other words, as indicated with the disposition of inclined grooves 2 in FIG. 2, any of the imaginary line a, b or c that is perpendicular to the sliding direction crosses both the bearing surface 3 and at least one inclined groove 2. With the above disposition of the inclined grooves 2, even when the bearing member 1 is installed without considering the position of inclined grooves, the surface pressure is exerted to the line to receive maximum load on the inner surface of the bearing 1 (corresponding to the imaginary lines in FIG. 2), and the bearing surface 3 of sliding surface and the inclined grooves 2 to store, supply and recover the lubricant, are brought into simultaneous contact, thereby attaining excellent wear resistance.

In the bearing for rocking motion in construction machinery, a large load is exerted to about ¼ to ⅙ of the inner surface of bearing at one point or two points on diagonal positions, in any case, the lubrication can be effected because the inclined groove 2 exists in the region receiving loads. In the case that the surface area of inclined grooves 2 exceeds 50% of the inner surface of bearing, the proportion of bearing surface 3 decreases, so that it is not desirable because the load per unit area increases and wearing is apt to occur.

Test samples of bearings 1 in which inner diameters d (mm) and lengths L (mm) were the same, were prepared. The inclination angle θ of inclined grooves was 20° or 30°, and the width w of grooves was 2, 4, 6 or 8 mm. Under the above conditions, the numbers of inclined grooves 2 and the ratios f (%) of surface areas of inclined grooves 2 to the inner surfaces are indicated in the following Table 1. The row of "Number of Grooves n" in the Table indicates the minimum numbers which meet the condition that an imaginary line perpendicular to the sliding direction can cross both the bearing surface and the inclined groove at any position of the inner surface of bearing. If the "Area Ratio f (%)" is small in Table 1, it is understood that the number of inclined grooves can be increased.

TABLE 1

| | | Inclination Angle θ | | | | | | | |
|---|---|---|---|---|---|---|---|---|---|
| | | 20° | | | | 30° | | | |
| | | Width of Groove w (mm) | | | | | | | |
| | | 2 | 4 | 6 | 8 | 2 | 4 | 6 | 8 |
| Inner Diameter: 30 mm | Number of Grooves n | 8 | 7 | 6 | 5 | 5 | 5 | 5 | 4 |
| | Area Ratio f (%) | 18 | 31 | 40 | 45 | 12 | 24 | 36 | 39 |
| Inner Diameter: 50 mm | Number of Grooves n | 8 | 8 | 7 | 6 | 6 | 5 | 5 | 5 |
| | Area Ratio f (%) | 11 | 21 | 28 | 32 | 9 | 14 | 22 | 29 |
| Inner Diameter: 80 mm | Number of Grooves n | 9 | 8 | 8 | 7 | 6 | 6 | 5 | 5 |
| | Area Ratio f (%) | 8 | 14 | 20 | 24 | 6 | 11 | 14 | 18 |
| Inner Diameter: 120 mm | Number of Grooves n | 9 | 8 | 8 | 8 | 6 | 6 | 6 | 5 |
| | Area Ratio f (%) | 5 | 9 | 14 | 18 | 4 | 7 | 11 | 12 |

The above-described inclined grooves 2 can be prepared by mixing various kinds of powder materials to form the foregoing composition, and the powder composition is then subjected to compacting operation using a tooling to obtain a green compact, in which the inclined grooves 2 are formed. The tooling is composed of dies, a core rod, and upper and lower punches and the set of them are mounted on a forming press. The core rod is provided with oblique raised narrow strips, like a helical gear, so as to form the inclined grooves 2. In order to facilitate the ejection of formed green compact, it is desirable that the core rod or dies and lower punch can be rotated.

Furthermore, it is possible to omit the provision of the raised strips like helical gears in the top portion of core rod by simplifying the structure of tooling. In that case, the bearing surface 3 is formed such that the inclined grooves 2 in the inner surface of green compact is closed near the end face of the bearing on the side of upper punch. The inclined grooves 2 in which one side ends are closed, can be used practically without causing any inconvenience. If necessary, the closed end face may be removed by cutting operation. The green compact is sintered in a reducing gas atmosphere at a temperature of about 1080 to 1150° C., which is followed by heat treatment and finishing by lathe work or grinding work.

3. Rows of Ridges in Circumferential Direction

The durability of bearing 1 can be improved by the provision of the foregoing inclined grooves 2. In addition to the grooves, a plurality of rows of ridges 4 are formed in the circumferential direction. As a result, the lubricant can be held in the recesses between the rows of ridges, which is effective to supply the lubricant to the portion receiving higher loads, thereby obtaining a preferable bearing 1. The rows of ridges 4 can be formed by the cutting tool of lathe and the height of ridges (depth of the recess between ridges) is preferably in the range of 2 to 20 μm.

When the height of the rows of ridges 4 is smaller than 2 μm, the surface properties of the inner surface of the bearing 1 is similar to the surface which is only ground with a grinding wheel of a cylindrical grinder, so that the effect of the provision of ridges 4 cannot be expected. When the height of ridges 4 is enlarged, although the effect to maintain lubricant is enhanced, however, in the portion receiving higher load, the ridges are liable to be worn down, so that the height of the rows of ridges is about 20 μm at the most. The rows of ridges 4 may be any of helical and circular, however, helical ridges can be formed efficiently. The pitch of the ridges 4 in the direction of shaft is preferably in the range of about 0.1 to 0.5 mm.

Figure 3:
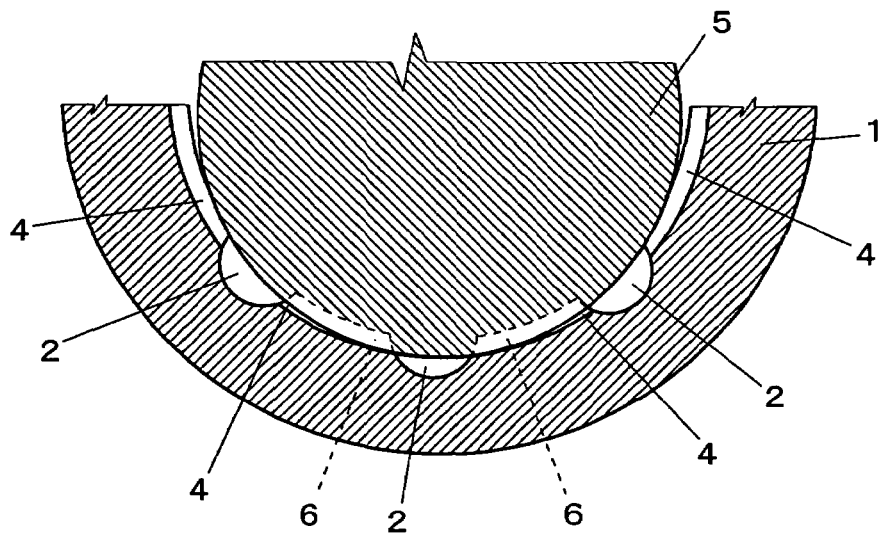
FIG. 3 is a partial cross-sectional view of the bearing and a shaft to illustrate the state in use.

FIG. 3 is a cross-sectional view of a portion to receive the action of load, which is intended to explain the wearing caused by sliding and lubrication between the mating shaft 5 and the bearing 1 having both the inclined grooves 2 and the rows of ridges 4. The configurations and sizes are represented with exaggeration. In the inner surface of the bearing 1, eight (8) inclined grooves 2 are formed around the shaft at a regular interval of 45° relative to the circumferential direction. While, the row of ridge 4 is formed circumferentially in the bearing surface 3. The inclined groove 2 and the recess between adjacent ridges 4 are impregnated with a lubricant having a viscosity suitable for the applied surface pressure.

The shaft 5 takes the lubricant from the inclined groove 2 and the recess between ridges 4. In the initial stage of operation, the shaft 5 comes into sliding contact with the upper part of the ridge 4. It is considered that, with the rocking in rotation of the shaft 5 or bearing 1, the lubricant moves within the rows of ridges 4 or between the inclined grooves 2 and the rows of ridges 4. In the initial stage of operation, the protruded portions of ridges 4 are subjected to high surface pressure, so that the portion to receive the highest surface pressure is worn off to reduce its height. In FIG. 3, the worn-off portions 6 are indicated with dotted lines. In the portion neighboring to the portion receiving higher surface pressure, the lubricant is supplied from the inclined grooves 2 and the rows of ridges 4 and the metal-to-metal contact between the bearing 1 and the mating shaft 5 is avoided and caused to slide under low frictional resistance. When the worn-off portion 6 is caused to spread to the size sufficient to resist the surface pressure, the expanding of worn-off portion 6 is terminated.

The inclined grooves 2 are lubricant supplying means of larger volume. Circumferentially extending rows of ridges 4 forms a new pressure receiving surfaces by the initial abrasion of the portion receiving high surface pressure. The remaining portions can lubricate throughout other shaft surface by the large number of other rows of ridges. In FIG. 3, the bearing which is provided with both the inclined grooves 2 and the rows of ridges 4, is illustrated, however, in the case that the bearing 1 is not provided with the rows of ridges 4 and the bearing surface 3 is only the ground surface, the above initial abrasion does not occur. However, good sliding performance can be attained with receiving the lubricant from the inclined grooves 2.

4. Lubricant

Concerning the lubricants which are fed to the inclined grooves 2 and the rows of ridges 4 in the bearing 1 of the present invention, the use for the surface pressure as high as 20 MPa or above is intended. So that, those having viscosities and lubricating properties suitable for the practical surface pressure may be employed, as disclosed in the conventional references for the art of lubrication. Furthermore, the size of bearing 1 is comparatively large and the width w and depth of inclined grooves 2 are also relatively large, so that in order to reduce the leakage of lubricant from the bearing members, it is desirable to use the lubricant having the properties similar to those of honey, glutinous starch syrup, mayonnaise, or semi-solid grease at ordinary temperatures.

The application of lubricant to the bearing member can be done by the impregnation into the pores of sintered alloy, the soaking of bearing members into a lubricant bath, or the spraying or brushing with a lubricant during the assembling of bearing. The viscosity of wax-like or grease-like lubricant can be lowered by heating or by diluting with a low viscosity lubricant to impart fluidity and the impregnation is done in vacuo. This is the same as the case in which a lubricant is impregnated into pores of sintered alloy.

For example, the lubricant are exemplified by high viscosity lubricant for industrial use for high surface pressure, and those as disclosed in the foregoing Japanese Laid-Open Patent Publication No. H10-246230. In the selection of lubricants, the viscosity and the grade of lubricating properties are determined in view of the size of bearing members, surface pressure to be applied, use conditions (e.g., summer or winter; tropic district or cold district), difficulty of maintenance operation.

Particular examples of lubricant are indicated in the following.

(1) Industrial lubricant in viscosity grade of ISO VG 460 (kinematic viscosity: 460 $mm^2$/s=cSt at 40° C.) or higher grade, (2) grease containing metallic soap, thickening agent, extreme pressure additive and solid lubricant, and a mixture of that grease and a lubricant.

(3) petroleum wax, synthetic wax and wax containing solid lubricant, and a mixture of any of these waxes and a lubricant, and (4) wax having a dropping point of 60° C. or higher containing extreme pressure additive and/or solid lubricant, and a mixture of that wax and a lubricant.

As described above, the bearing according to the present invention is suitable for use under the conditions that the size is comparatively large, the applied surface pressure is as high as 20 MPa or above, the sliding speed is relatively slow, and the operation is done under sliding in rocking motion. Such usages are exemplified by the bearings for joints of construction machinery such as bulldozer and power shovel, bearings for press machines, bearings for vehicle brake links, bearings for hinges, joint bearings for conveying robots, and bearings for casters.

What is claimed is:

1. A sliding bearing for use under high load, in which the alloy used for making said bearing is composed of an iron-based sintered alloy having quenched structure, the inner surface of said bearing is provided with inclined grooves of an inclination angle in the range of 10 to 40° relative to the direction perpendicular to the sliding direction, the width of said inclined grooves is in the range of 2 to 8 mm, the area of said inclined grooves is 50% or less of the total inner surface of said bearing, an imaginary line perpendicular to the sliding direction crosses both the inclined groove and the bearing surface at any position of the inner bearing surface, and at least said inclined grooves are impregnated with a lubricant.

2. The sliding bearing for use under high load in claim 1, wherein the maximum depth of said inclined grooves is in the range of 0.5 to 3 mm.

3. The sliding bearing for use under high load in claim 1 or 2, wherein bearing surface of said bearing is provided with a plurality rows of ridges of 2 to 20 μm in height, which being formed by cutting operation, and said rows of ridges are arranged helically or circularly in circumferential direction.

4. The sliding bearing for use under high load in claim 1, wherein said bearing is made of any one of said iron-based sintered alloy of:
- (A) an alloy containing 7 to 30% by mass of copper, and copper particles and/or copper alloy particles being dispersed in the iron-based alloy matrix containing metal structure of martensite;
- (B) an alloy of the metal structure containing the dispersion of 5 to 30% by mass of iron-based alloy particles or cobalt-based alloy particles that are harder than said iron-based alloy matrix in said alloy (A); and
- (C) an alloy containing 3% or less by mass of the particles of graphite and/or molybdenum disulfide in said alloy (A) or in said alloy (B).

5. The sliding bearing for use under high load in claim 1, wherein said bearing is used under the conditions that a shaft and a bearing member are subjected to the sliding in rocking motion and the surface pressure exerted to the shaft surface and sliding surface is 20 MPa or more.

* * * * *